United States Patent Office 3,472,046
Patented Oct. 14, 1969

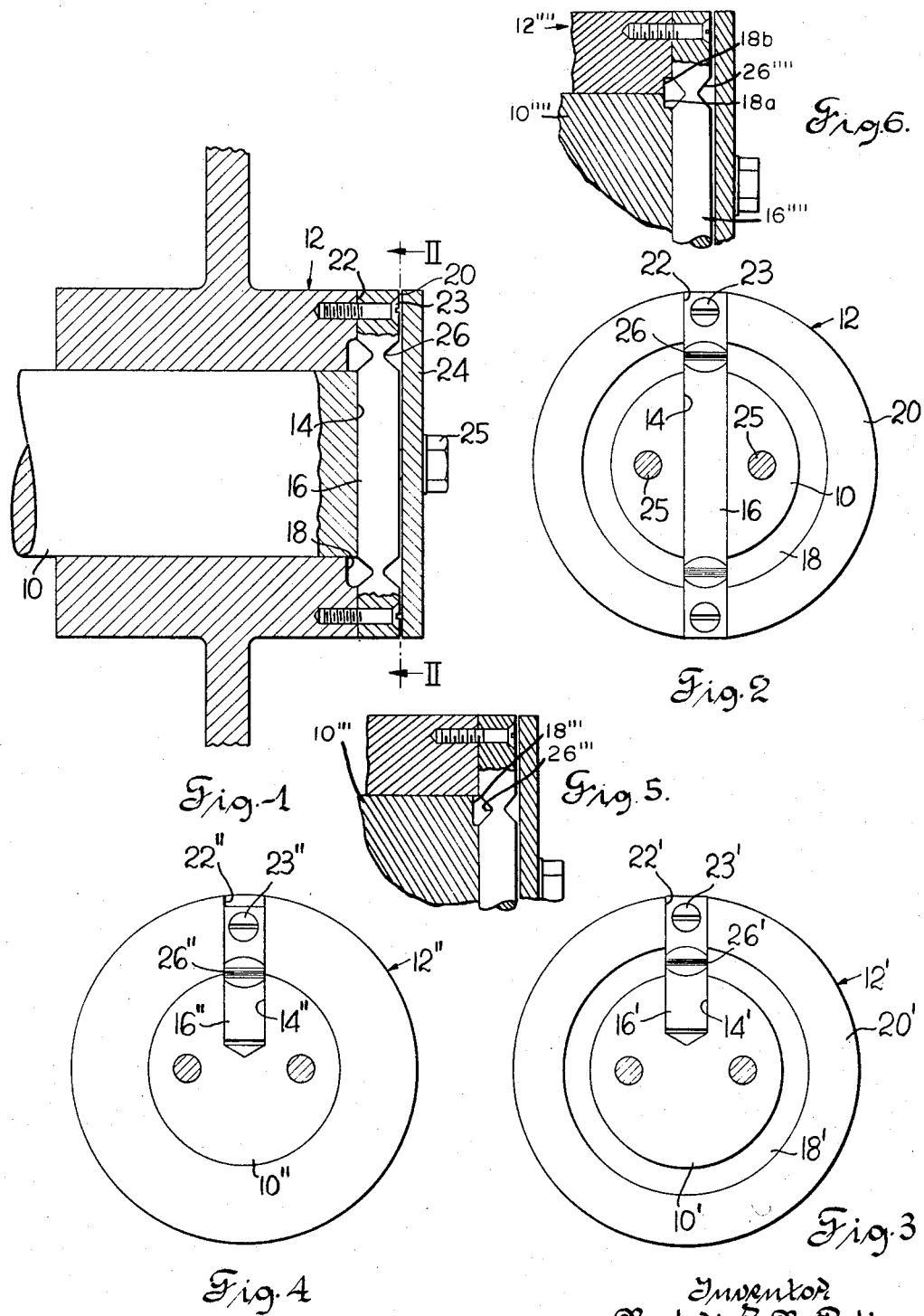

3,472,046
TORQUE LIMITING SAFETY DEVICE
Roderick B. Potter, Milwaukee, Wis., assignor to Allis-Chalmers Manufacturing Company, Milwaukee, Wis.
Filed Nov. 1, 1967, Ser. No. 679,794
Int. Cl. F16d 7/00
U.S. Cl. 64—28        10 Claims

ABSTRACT OF THE DISCLOSURE

A torque overload release construction for a shaft and a hub mounted thereon in accordance with which a key member is received in a radial slot in the end face of the shaft and in a radial slot in the end face of the hub member. The key member is provided with a weakened or necked-in portion coincident with the inflection point on the portion of the key that is subject to a bending moment. The key member is subject only to shear stress, and bending stress and bearing stress are eliminated as factors in the key failure, whereby the maximum torque which the key will transmit is more easily calculated and more accurately predictable.

BACKGROUND OF THE INVENTION

Field of the invention

This invention relates to a key connected shaft and hub and more particularly to an improved safety construction for releasing the hub from the shaft to prevent transmission of torque overload between the hub and the shaft.

Description of the prior art

It is well known in the art to provide a shear pin or shearable key to interconnect a shaft and a hub member mounted thereon so that upon the occurrence of torque overload the hub will be released from the shaft to thereby prevent damage to the apparatus of which the hub and shaft form a part, or to the prime mover therefor. However, in the constructions of the prior art the problem arises that it is difficult to predict with any degree of exactness the value of overload at which the shear pin or key will fail. This is due to the fact that in the prior art constructions the failure of the key depends upon three factors, as follows: (1) the bending stress on the key (usually a minor factor); (2) the bearing stress on the key; and (3) the shear stress on the key. Since in the prior art constructions the maximum torque which the key will transmit depends upon the resultant of a plurality of factors, as just enumerated, no one of which can be exactly predicted, the predictability of the torque at which key failure occurs is subject to a considerable margin of error.

SUMMARY OF THE INVENTION

Accordingly, it is an object of this invention to provide a key connection between a shaft and a hub in which the key will fail at a closely predetermined value of overload torque to release the hub and shaft from their connection.

It is another object of the invention to provide a torque overload responsive key connection between a shaft and a hub in which shear stress is isolated as the controlling factor in the key failure.

It is still another object of the invention to provide an overload release construction between a shaft and a hub which is responsive only to shear stress upon the keyed connection, whereby the value of overload at which the key failure will occur can be more closely predetermined than in prior art constructions.

In achievement of these objectives, there is provided in accordance with an embodiment of this invention a torque overload release construction for a shaft and a hub mounted thereon in accordance with which a key member is received in a radial slot in the end face of the shaft and in a radial slot in the end face of the hub member. The key member is provided with a weakened or necked-in portion coincident with the inflection point on the portion of the key that is subject to a bending moment. The key member is subject only to shear stress, and bending stress and bearing stress are eliminated as factors in the key failure, whereby the maximum torque which the key will transmit is more easily calculated and more accurately predictable. In a preferred embodiment, an annular recess is provided in the end face of the hub, or in the end face of the shaft, or in both, with the weakened or necked-in portion of the key lying in the annual recess, whereby to permit free relative rotation of the shaft and hub upon failure of the key.

Further objects and advantages of the invention will become apparent from the following description taken in connection with the accompanying drawings in which:

BRIEF DESCRIPTION OF THE DRAWINGS

FIG. 1 is a view in longitudinal section of a shaft and hub provided with a torque overload release construction in accordance with the invention;

FIG. 2 is a view taken along line II—II of FIG. 1;

FIG. 3 is a view similar to FIG. 2 of a modified embodiment in accordance with the invention in which a key of shorter radial length than the embodiment of FIGS. 1 and 2 is provided;

FIG. 4 is a view similar to FIGS. 2 and 3 in which the annular recess or counterbore of the embodiments of FIGS. 1–3 is eliminated.

FIG. 5. is a fragmentary view similar to FIG. 1 of an embodiment in which the shaft is provided with an annular recess; and FIG. 6 is a fragmentary view similar to FIG. 1 of an embodiment in which the shaft and hub are provided with concentric annular recesses in contiguous relation to each other.

DESCRIPTION OF THE PREFERRED EMBODIMENT

Referring now to the drawing, there is shown a shaft member 10 having mounted thereon a hub member generally indicated at 12. The hub member 12 may, for example, form part of a jaw or gyratory crusher construction and be subject to possible torque overloads. The shaft 10 and hub 12 are provided with a keyed connection for permitting release of the shaft and hub from each other at a predetermined value of overload torque as will now be described. The shaft 10 is provided on the end face thereof with a diametral slot 14 for receiving the key member generally indicated at 16. The hub member 12 is provided with an annular recess or counterbore 18 extending radially outwardly from the inner bore of the hub for a predetermined radial distance, the annular recess or counterbore 18 being bounded by the radially outer portion or end face 20 of the hub. Key 16 extends beyond the diametrically opposite ends of slot 14 in the end of shaft 10, spanning diametrically opposite portions of annular recess or counterbore 18 in hub 12, with the opposite ends of key 16 being received in radial slots 22 in the radially outer portion or end face 20 of hub 12. Key 16 is preferably made of sufficient length so that the diametrically opposite ends thereof are flush with the outer peripheral surface of hub 12. The opposite ends of key 16 are secured to end face 20 of hub 12 by means of screws 23. A keeper plate 24 covers the end of shaft 10 and hub 12, being held in place by screws 25 which extend into the end of shaft 10. Keeper plate 24 prevents axial displacement of hub 12, and also serves to maintain key 16 in position, particularly after fracture of the key occurs due to overload torque.

In accordance with an important feature of the construction, key member 16 is provided with diametrically spaced weakened portions 26 which are respectively centrally located with respect to the radial dimension of the hub counterbore 18 and at diametrically opposite portions of counterbore 18. The key 16 is preferably necked-in in a direction extending axially of the shaft, as best seen in FIG. 1. The key 16 is preferably, although not necessarily, of rectangular cross section in portions thereof lying away from the weakened region or regions. The location of the weakened or necked-in portions 26 centrally of the radial dimension of counterbore 18 locates the weakened portions 26 at the neutral or inflection point on the moment diagram of the key so that bending moment is eliminated as a factor contributing to the failure of the key member upon the occurrence of torque overload. The inflection point of the key is defined as the point on the key, considering the key as a beam, at which there is zero bending moment.

The bearing stresses on the key are respectively located at the interface between the key and the shaft and the interface between the key and the hub. Since these bearing stress locations are remote with respect to the weakened or necked-in portions 26 of the key, the bearing stresses are not a factor in the failure of the key at the weakened portions.

The only remaining factor causing failure of the key under torque overload conditions is shear stress, since in accordance with the construction just described bending stress and bearing stress have been eliminated as factors.

Because of the fact that bending stress and bearing stress have been eliminated as factors in key failure under torque overload, leaving only shear stress as a factor, it is possible to design the safety release device hereinbefore described so as to fail at a rather closely predictable and closely calculable value of torque overload.

In a modified embodiment shown in FIG. 3 a key 16' is provided which is of substantially only one-half the length of the hub diameter. Key 16' is received in a radial slot 14' of shaft 10', and spans the annular counterbore 18' of hub 12', being received in a radial slot 22' in the radially outer portion or end face 20' of hub 12'. The key is secured to the end face of hub 12' by a screw 23'. The key 16' is provided with a weakened or necked-in portion 26' which is centrally located with respect to the radial dimension of counterbore 18'. The construction shown in FIG. 3 functions in the same manner as the previously described construction shown in FIGS. 1 and 2.

While the embodiments of FIGS. 1-3, inclusive, show and describe the counterbore 18 or 18' as being located on the hub, it is also possible, as seen in FIG. 5, to instead provide an annular recess 18''' on the shaft 10''', in which case the weakened portion 26''' of the key would be centrally located with respect to the radial dimension of the annular recess 18''' on the shaft. As seen in FIG. 6, it is also possible to have both the shaft 10'''' and the hub 12'''' respectively provided with concentric annular recesses 18a and 18b in contiguous relation to each other with the weakened portion 26'''' of the key 16'''' being centrally located with respect to the total radial dimension of the composite annular recess defined by the two contiguous annular recesses 18a and 18b.

In still another modification shown in FIG. 4, the annular recess or counterbore is eliminated. Thus, key 16'' is received in slot 14'' of shaft 10'' and in slot 22'' of hub 12'', and is secured in position by a screw 23'' extending into the end face of the hub. The weakened portion 26'' of key 16'' is symmetrically located radially with respect to the interfaces between the shaft 10'' and hub 12''. In this embodiment, after failure of the key occurs due to torque overload the shaft and hub are not free to move relatively to each other without causing possible damage to the shaft or hub or to both due to the remnants of the broken key. Hence, when using this embodiment of the invention means should be provided for instantly stopping relative rotation of the shaft and hub upon breakage of the key. Such means, which form no part of this invention, could include, for example, an electrical or mechanical sensing device responsive to load drop which would respond to the instantaneous load drop caused by the breakage of the key, and a brake device actuated in response to detection of the load drop by the load drop sensing means, the braking device being effective upon actuation thereof to prevent relative rotation of the shaft and hub.

The embodiments of FIGS. 1 and 2 have the advantage that the annular groove or counterbore 18 or 18' permits free relative rotation between the shaft and hub after breakage of the key has occurred, since the annular groove or counterbore provides ample clearance space for movement of any portions of the broken key which project into the annular groove or clearance space, or for any debris which may have resulted from the breaking of the key.

The overload torque at which key 16, 16' or 16'' will break can be determined by proper design of the geometry of the key including such factors as the contour and cross sectional area of the weakened portion of the key, and by selection of an appropriate material for the key depending upon the maximum overload torque at which key breakage should occur.

It is obvious from the foregoing description and drawing that the detailed arrangement and construction of the various elements may be modified considerably without departing from the spirit of the invention, which must not be considered as limited strictly to the constructions shown and described.

The embodiments of the invention in which an exclusive property or privilege is claimed are defined as follows:

1. In combination, a shaft member, a hub member mounted on said shaft member, first slot means in the end face of said shaft member, second slot means in the end face of said hub member, a key received in said first and second slot means, said key having a weakened portion located at the inflection point of said key, an annular recess in at least one of said members, said key spanning said annular recess with the weakened portion of said key lying in said annular recess, said weakened portion being centrally located with respect to the radial dimension of said annular recess.

2. The combination defined in claim 1 including a counterbore in said hub member defining an annular recess in said hub member, said key spanning said counterbore with said weakened portion of said key lying in said counterbore, said weakened portion being centrally located with respect to the radial dimension of said counterbore.

3. The combination defined in claim 1 including an annular recess in said shaft member, said key spanning said annular recess with said weakened portion of said key lying in said annular recess, said weakened portion being centrally located with respect to the radial dimension of said annular recess.

4. The combination defined in claim 1 in which said end face of said shaft member is provided with a slot extending across the entire diameter of said shaft member, and said end face of said hub member is provided with a pair of diametrically opposed slots, said key member being positioned in said slot in said end face of said shaft member and in said pair of diametrically opposed slots in said end face of said hub member.

5. The combination defined in claim 1 in which said end face of said shaft member is provided with a slot extending across only part of the diameter of said shaft member.

6. The combination defined in claim 1 including fastening means securing said key to said hub.

7. The combination defined in claim 1 including a cover plate fastened to the end of said shaft in axially overlying relation to said key.

8. The combination defined in claim 1 including an annular recess in said shaft member and a counterbore in said hub member positioned in concentric relation to each other and contiguous each other and respectively constituting first and second annular recesses which together define a composite annular recess, said key spanning said composite annular recess with said weakened portion of said key being centrally located with respect to the total radial dimension of said composite annular recess.

9. The combination defined in claim 1 in which said end face of said shaft member is provided with a slot extending across the entire diameter of said shaft member, and said end face of said hub member is provided with a pair of diametrically opposed slots, said key being positioned in said slot in said end face of said shaft member and in said pair of diametrically opposed slots in said end face of said hub member, said key spanning diametrically opposite portions of said annular recess, said key being provided with at least one weakened portion, each weakened portion being centrally located with respect to the radial dimension of said annular recess.

10. The combination defined in claim 1 in which said end face of said shaft member is provided with a slot extending across the entire diameter of said shaft member, and said end face of said hub member is provided with a pair of diametrically opposed slots, said key being positioned in said slot in said end face of said shaft member and in said pair of diametrically opposed slots in said end face of said hub member, said key spanning diametrically opposite portions of said annular recess, said key being provided with a separate weakened portion lying in each of the diametrically opposite portions of said annular recess, each weakened portion being centrally located with respect to the radial dimension of said annular recess.

References Cited

UNITED STATES PATENTS

| | | | |
|---|---|---|---|
| 1,574,466 | 2/1926 | Brown | 64—28 |
| 1,805,879 | 5/1931 | McKenny | 64—28 |
| 2,585,113 | 2/1952 | Gredell | 64—28 |
| 2,698,528 | 1/1955 | Boesch | 64—28 |
| 2,748,578 | 6/1956 | Potts | 64—28 |

HALL C. COE, Primary Examiner

U.S. Cl. X.R.

287—131